(12) United States Patent
Lee et al.

(10) Patent No.: US 11,649,110 B2
(45) Date of Patent: *May 16, 2023

(54) ROBOT

(71) Applicant: LG ELECTRONICS INC., Seoul (KR)

(72) Inventors: Iljae Lee, Seoul (KR); Dooil Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 650 days.

This patent is subject to a terminal disclaimer.

(21) Appl. No.: 16/440,225

(22) Filed: Jun. 13, 2019

(65) Prior Publication Data

US 2019/0382200 A1  Dec. 19, 2019

(30) Foreign Application Priority Data

Jun. 15, 2018  (KR) .......................... 10-2018-0069115

(51) Int. Cl.
*B65F 1/14* (2006.01)
*B65F 1/16* (2006.01)
(Continued)

(52) U.S. Cl.
CPC .......... *B65F 1/1473* (2013.01); *B65F 1/1638* (2013.01); *G05D 1/021* (2013.01);
(Continued)

(58) Field of Classification Search
CPC .................. B65F 1/1473; B65F 1/1638; B65F 2210/128; B65F 2210/1443;
(Continued)

(56) References Cited

U.S. PATENT DOCUMENTS 4,736,915 A * 4/1988 Miller ................... A47B 77/16
  108/25
4,834,253 A * 5/1989 Crine ..................... B65F 1/085
  220/23.4
(Continued)

FOREIGN PATENT DOCUMENTS

JP  H06-014106   2/1994
JP  2006-102861  4/2006
(Continued)

OTHER PUBLICATIONS

Mazzolai et al., *The DustCart Service Robot at Work in the Town of Peccioli: Focus on Social and Legal Challenges*, Urban Service Robotics: Challenges and Opportunities, The 15th International Conference on Advanced Robotics, Jun. 20, 2011.

(Continued)

*Primary Examiner* — Hai Phan
*Assistant Examiner* — Son M Tang
(74) *Attorney, Agent, or Firm* — Ked & Associates, LLP

(57) ABSTRACT

A guide robot includes a lower module includes a wheel and a motor provided inside the lower module, and an upper module disposed at an upper portion of the lower module and including a trash can assembly and a display unit. The upper module includes a body part coupled to the upper portion of the lower module and a head part rotatably coupled to an upper portion of the body part. The body part includes a front case forming a front outer appearance of the body part and including the trash can assembly provided inside the front case, and a rear case forming a rear outer appearance of the body part and including the display unit. A garbage insertion part is provided at a portion of the front case corresponding to an upper portion of the trash can assembly to insert garbage into the trash can assembly.

17 Claims, 11 Drawing Sheets

(51) Int. Cl.
*G05D 1/02* (2020.01)
*G01F 23/00* (2022.01)

(52) U.S. Cl.
CPC . *B65F 2210/128* (2013.01); *B65F 2210/1443* (2013.01); *B65F 2210/168* (2013.01); *B65F 2230/14* (2013.01); *G01F 23/00* (2013.01)

(58) Field of Classification Search
CPC ............ B65F 2210/168; B65F 2230/14; B65F 1/1468; B65F 1/1421; B65F 1/14; B65F 2210/184; G05D 1/021; G01F 23/00; G01F 23/284; G01F 23/2962; G01F 23/0015; G01F 23/0076; G01F 23/0092; G01F 23/2921; B25J 11/008; B25J 5/007; B25J 9/0009; B25J 19/02
See application file for complete search history.

(56) References Cited

U.S. PATENT DOCUMENTS

| | | | | |
|---|---|---|---|---|
| 4,847,927 | A * | 7/1989 | Blanc | B65F 1/0066 4/629 |
| 5,042,374 | A * | 8/1991 | Klepacki | B30B 9/3053 100/229 A |
| 5,139,299 | A * | 8/1992 | Smith | B65F 1/0066 220/23.4 |
| 5,398,623 | A * | 3/1995 | Lautenschlager | F23G 5/002 110/346 |
| 5,690,025 | A * | 11/1997 | Hawkins | B30B 1/34 100/229 A |
| D387,529 | S * | 12/1997 | Spitaler | D34/1 |
| 6,144,180 | A | 11/2000 | Chen et al. | |
| 6,789,585 | B1 * | 9/2004 | Janke | F25D 23/126 141/198 |
| 9,352,887 | B2 * | 5/2016 | Poss | B65D 55/00 |
| 11,144,066 | B1 * | 10/2021 | Ebrahimi Afrouzi | G05D 1/0287 |
| 11,192,252 | B2 * | 12/2021 | Lee | B25J 19/0075 |
| 2002/0056377 | A1 * | 5/2002 | Gawley | B30B 9/3042 100/35 |
| 2002/0108507 | A1 * | 8/2002 | May | B65F 1/1638 700/229 |
| 2004/0174268 | A1 * | 9/2004 | Scott | B65F 1/1638 220/211 |
| 2005/0005785 | A1 * | 1/2005 | Poss | B65F 1/1426 100/240 |
| 2006/0010837 | A1 * | 1/2006 | Jurus | B65F 1/062 53/436 |
| 2007/0101875 | A1 * | 5/2007 | Poss | F03G 6/001 100/229 A |
| 2007/0192910 | A1 * | 8/2007 | Vu | B25J 19/06 700/245 |
| 2007/0209846 | A1 * | 9/2007 | Wilson | B65F 1/1638 180/65.1 |
| 2008/0067227 | A1 * | 3/2008 | Poss | A47G 29/30 232/17 |
| 2009/0308256 | A1 * | 12/2009 | Hiron | A47J 31/46 99/287 |
| 2010/0321149 | A1 * | 12/2010 | Foster | G07C 9/257 340/5.2 |
| 2012/0330850 | A1 * | 12/2012 | Di Giugno | B65F 1/1607 705/308 |
| 2013/0278067 | A1 * | 10/2013 | Poss | B65F 1/1468 307/62 |
| 2014/0031981 | A1 * | 1/2014 | Fernando | B25J 9/1676 700/253 |
| 2014/0125490 | A1 * | 5/2014 | Ullrich | B65F 1/141 340/870.01 |
| 2014/0184110 | A1 * | 7/2014 | Wang | H02P 1/02 318/139 |
| 2014/0263432 | A1 * | 9/2014 | Jacobs | A47J 31/52 222/65 |
| 2015/0101499 | A1 * | 4/2015 | Hitchcock | B30B 1/103 100/229 A |
| 2016/0050514 | A1 * | 2/2016 | Skocypec | H04W 4/38 455/68 |
| 2016/0286993 | A1 * | 10/2016 | Pau | A47G 19/2288 |
| 2017/0096299 | A1 * | 4/2017 | Yang | G10L 25/51 |
| 2017/0156540 | A1 * | 6/2017 | Wheatley | A47J 31/521 |
| 2018/0036887 | A1 * | 2/2018 | Shim | B25J 11/001 |
| 2018/0255971 | A1 * | 9/2018 | Moon | A47J 36/00 |
| 2018/0286250 | A1 * | 10/2018 | Cronin | G05D 1/0297 |
| 2019/0150687 | A1 | 5/2019 | Kwon et al. | |
| 2019/0270585 | A1 * | 9/2019 | Moore | B65F 1/1426 |
| 2019/0382200 | A1 | 12/2019 | Lee et al. | |
| 2020/0023513 | A1 | 1/2020 | Ha et al. | |
| 2020/0254623 | A1 * | 8/2020 | Eun | G06K 7/10366 |

FOREIGN PATENT DOCUMENTS

| | | |
|---|---|---|
| KR | 10-0516850 | 9/2005 |
| KR | 10-2010-0094645 | 8/2010 |
| KR | 10-1000854 | 12/2010 |
| KR | 20-0454523 | 7/2011 |
| KR | 10-2011-0124593 | 11/2011 |
| KR | 20-0460793 | 6/2012 |
| KR | 10-1193610 | 10/2012 |
| KR | 10-2013-0049222 | 5/2013 |
| KR | 10-1412527 | 6/2014 |
| KR | 10-2018-0020755 | 2/2018 |

OTHER PUBLICATIONS

Korean Office Action dated Dec. 12, 2019 issued in KR Application No. 10-2018-0069114.
Korean Office Action dated Dec. 12, 2019 issued in KR Application No. 10-2018-0069115.
Korean Notice of Allowance dated Jun. 8, 2020 issued in KR Application No. 10-2018-0069114.
Korean Notice of Allowance dated Jun. 8, 2020 issued in KR Application No. 10-2018-0069115.
Sales et al., Grid Ant Colony Optimization Applied to a Multi-robotic Garbage Collection System, 2014, IEEE, p. 187-192 (Year: 2014).
Ferri et al., DustCart, an autonomous robot for door-to-door garbage collection: From DustBot project to the experimentation in the small town of Peccioli, 2011, IEEE, p. 655-660 (Year: 2011).
Vargas et al., Applying particle swarm optimization to a garbage and recycling collection problem, 2012, IEEE, p. 1-8 (Year: 2012).
Sempe et al., Adaptive patrol for a group of robots, 2003, IEEE, p. 2865-2869 (Year: 2003).
United States Office Action dated Jun. 29, 2021 issued in U.S. Appl. No. 16/440,313.
U.S. Appl. No. 16/440,313, filed Jun. 13, 2019.

* cited by examiner

ROBOT

CROSS-REFERENCE TO RELATED APPLICATION

This application claims priority under 35 U.S.C. § 119 to Korean Application No. 10-2018-0069115 filed on Jun. 15, 2018, whose entire disclosure is hereby incorporated by reference. This application is also related to U.S. patent application Ser. No. 16/440,313 filed on Jun. 13, 2019, whose entire disclosure is hereby also incorporated by reference.

BACKGROUND

1. Field

The present specification relates to a robot, and more particularly to a robot that performs a guidance function.

2. Background

The application fields of robots are generally classified into industrial, medical, space, and submarine fields. For example, in the mechanical machining industry such as the production of a vehicle, robots may perform repeated work. In other words, there are present many industrial robots which continuously repeat the same work once a human being teaches work performed by the arm of the human being.

In addition, a technique, in which a camera is mounted on a robot, has already been widely realized. The robot may determine the position thereof or recognize an obstacle using the camera. In addition, displaying the captured image on the display unit has been sufficiently realized.

In general, although the robot provides various services depending on places, users, or purposes, the robot performs only a typical operation of moving to a specified distance at a specified speed for a specified hour while enduring a specified load in order to provide the services.

Recently, a scheme has been developed to provide, through a robot, a service within an airport to cope with the explosive growth of airport users and in an effort to make a leap into a smart airport. When an artificial intelligence (AI) robot is employed for an airport, the robot may perform the intrinsic role, which cannot be performed by an existing computer system, of a human being in place of the human being. Accordingly, it may be expected that the provided service is improved in quantitative and qualitative aspects.

The demands for robots which provide convenience to a user or take the role of a human being are rapidly increased throughout social facilities, such as large shopping facilities, cultural facilities, and public facilities, as well as the airport.

Korean Patent Registration No. 10-1193610 (issued on Oct. 16, 2012) discloses an intelligent robot for providing traffic information and having an autonomous traveling function. The reference discusses a robot which avoids an obstacle while autonomously traveling in a crosswalk to make a traffic guidance map. However, although the conventional robot in this reference outputs an alarm sound or displays display information on a screen of a display to provide traffic information, the robot cannot serve as a trash can for collecting garbage. For example, although an airport has a wide internal space, a smaller number of trash cans are disposed. Accordingly, it is difficult for users of an airport to find the trash can.

In addition, the trash can is provided at the corner of the airport due to the problem related to the outer appearance thereof and the bed odor thereof. Accordingly, the user of the airport has to go to the corner of the airport, at which the trash can is present, to throw away the garbage. In addition, when the garbage is fully filled in the trash can, a cleaner has to go to each of trash cans spaced apart from each other to empty the trash can.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the specification may be practiced. These embodiments are described in sufficient detail to enable those skilled in the art to practice the specification, and it is understood that other embodiments may be utilized and that logical structural, mechanical, electrical, and chemical changes may be made without departing from the spirit or scope of the specification. To avoid detail not necessary to enable those skilled in the art to practice the specification, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present specification. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

In the present specification, an embodiment that a guide robot is applied to an airport will be described by way of example. However, it should be noted that the guide robot according to the present specification is applicable not only to the airport, but to all social facilities such as a large shopping facility, a cultural facility or a public facility.

Figure 1:
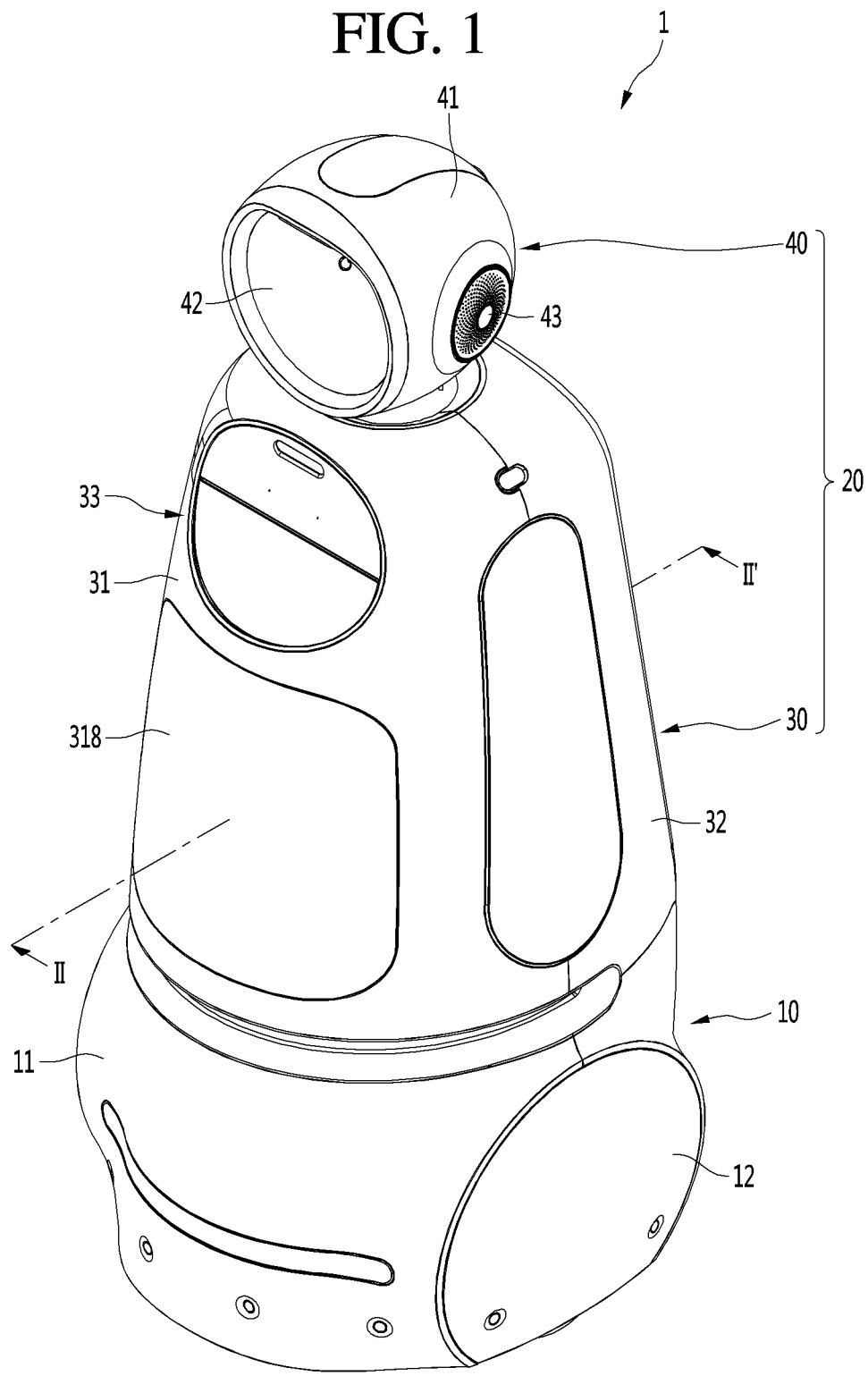
FIG. 1 is a front perspective view illustrating an outer appearance of a guide robot according to an embodiment of the present specification.
Figure 2:
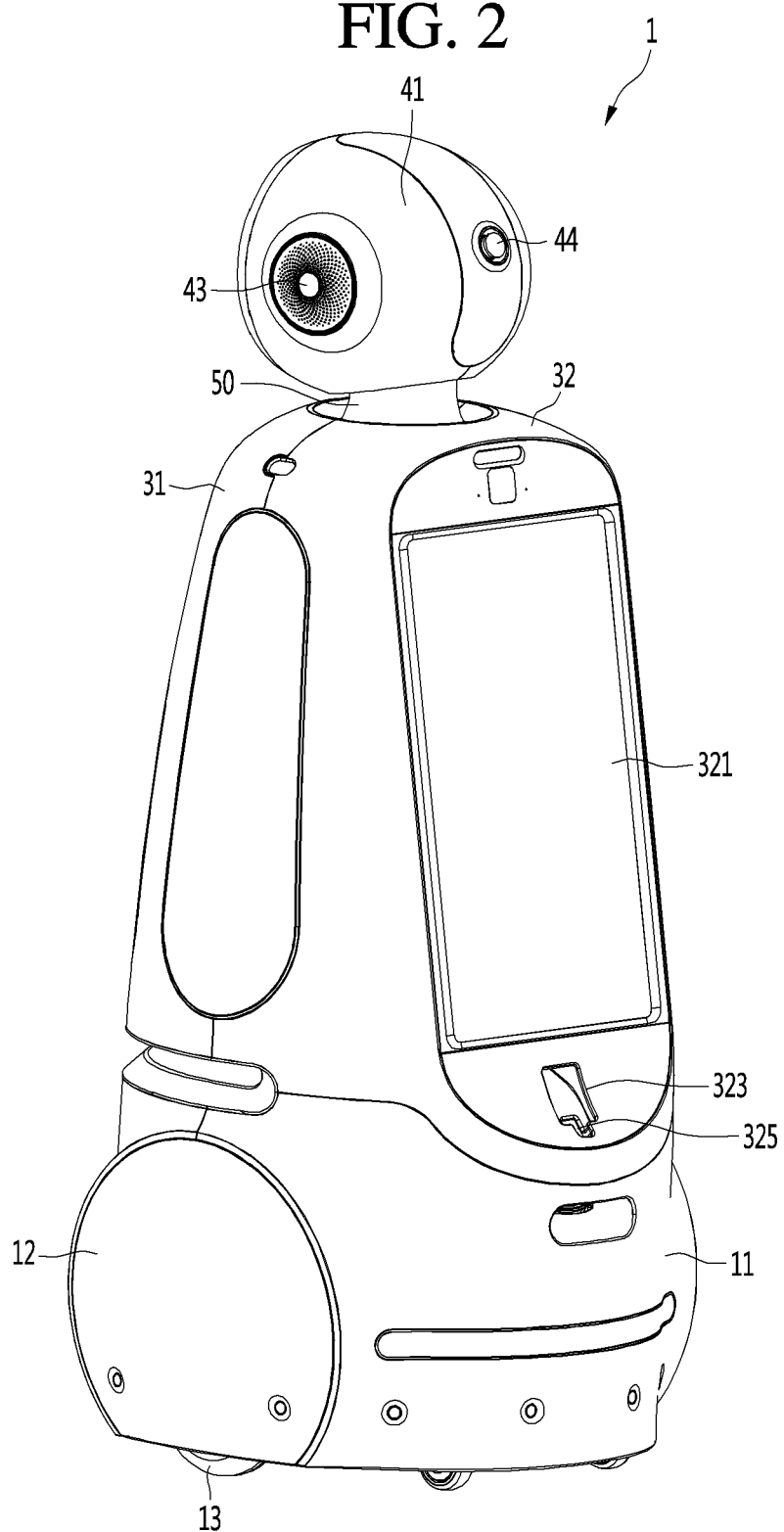
FIG. 2 is a rear perspective view illustrating an outer appearance of a guide robot, according to an embodiment of the present specification.

FIG. 1 is a front perspective view illustrating an outer appearance of a guide robot according to an embodiment of the present specification, and FIG. 2 is a rear perspective view illustrating an outer appearance of a guide robot according to an embodiment of the present specification. Referring to FIGS. 1 and 2, according to an embodiment of the present specification, a guide robot 1 includes a lower module 10 and an upper module 20 coupled to an upper portion of the lower module 10.

The lower module 10 includes a plurality of parts for autonomous driving and the upper module 20 includes a plurality of parts for performing a function of directions, an airport information providing function, and a trash can function for the user. In detail, the lower module 10 may withstand the load of the upper module 20 and may travel in direct contact with the ground surface. The lower module 10 may travel in one direction or another direction and rotate at 360 degrees, along a specified traveling route.

The lower module 10 may be provided therein with a wheel 13, a wheel motor, a light detection and ranging (LiDar) sensor, and a battery (not illustrated) for traveling, and parts such as the wheel, the wheel motor, the LiDar sensor, and the battery may be covered by a lower case (or first housing) 11 and a wheel case 12. Accordingly, since the internal parts of the lower module 10 are shielded by the lower case 11 and the wheel case 12, the internal parts may be protected from the outside and the robot may have a neat outer appearance.

The upper module 20 is installed at the upper portion of the lower module 10 to provide various services based on the eye height of a user. In detail, the upper module 20 includes a body part 30 disposed above the lower module 10, and a head part 40 rotatably disposed above the body part 30.

In detail, the body part 30 may be formed to have a long length in the vertical direction, and may have a roly poly (or kidney bean) shape becoming slimmer upward. In addition, since the horizontal cross-sectional area of the body part 30 is formed to be smaller than the horizontal cross-sectional area of the lower module 10, the body part 30 has a structure stably supported above the lower module 10.

In addition, the body part 30 may be detachably coupled to the lower module 10. In other words, the lower portion of the body part 30 may be engaged with the upper portion of the lower module 10 while making contact with the upper portion of the lower module 10. According to occasions, the lower portion of the body part 30 may be separated from the upper portion of the lower module 10 and used. In this case, the lower module 10 may be used to carry a load or an object of a user.

Alternatively, the upper module 20 supporting different service may be coupled to the upper portion of the lower module 10. In this case, the guide robot 1 may provide services corresponding to not only the airport but different facilities. In other words, since the lower module 10 may be used without change and the upper module 20 may be changed to provide the different service, the lower module 10 may be shared.

In detail, the body part 30 includes a body case (or second housing) which forms an outer appearance thereof. The body case includes a front case (also referred to as a first case) 31 forming a front outer appearance of the body part 30 and a rear case (or second case) 32 forming a rear outer appearance of the body 30.

The front case 31 and the rear case 32 may cover the body part 30 in forward and backward directions. In this case, the front case 31 and the rear case 32 may be coupled to each other. In other words, since the front case 31 and the rear case 32 constitute two parts without being integrally formed, the assembling of the body part 30 may be easily performed.

In addition, the body part 30 further includes a garbage insertion part 33 to insert garbage and a trash can assembly 34 (see FIG. 3) to store the garbage inserted through the garbage insertion part 33.

The garbage insertion part 33 serves as an entrance for moving garbage into the trash can assembly 34 disposed inside the body part 30. To this end, the garbage insertion part 33 may be positioned higher than the trash can assembly 34. Accordingly, the garbage inserted through the garbage insertion part 33 may be dropped down due to the self-load of the garbage and moved into the trash can assembly 34.

The garbage insertion part 33 is formed at one side of the body case. For example, the garbage insertion part 33 may be provided in the front case 31. In this case, a mounting opening 311 (see FIG. 4) is formed in the front case 31, and the garbage insertion part 33 may induce the insertion of garbage by opening or closing the mounting opening 311.

In addition, the body part 30 further includes a main door 318 for withdrawing the trash can assembly 34, which is disposed inside the body case, out of the body case. The main door 318 may be interpreted as a communication passage to empty the trash can assembly 34 when garbage is fully filled in the trash can assembly 34. In other words, when the main door 318 is open, the trash can assembly 34 may be exposed to the outside. Accordingly, the garbage may be removed by withdrawing the trash can assembly 34 out of the main door 318.

The garbage insertion part 318 is formed at one side of the body case. In other words, the main door 318 may be provided in the front case 31 at which the garbage insertion part 33 is positioned. The main door 318 is positioned lower than the garbage insertion part 33 to shield the trash can assembly 34.

In addition, the body part 30 further includes a display unit 321. The display unit 321 provides various visual information for a user. For example, when the display unit 321 provides information on an airport, the display unit 321 may provide airport gate query information, information on directions, or ticketing related services.

The display unit 321 is installed at one side of the body case. For example, the display unit 321 may be installed in the rear case 32. In other words, the display unit 321 may be disposed in a rearward direction of the guide robot 1 and may be disposed in opposition to the garbage insertion part 33.

The reason for disposing the display unit 321 in the rear portion of the guide robot 1 is that, when the guide robot 1 moves before a user along a set route to provide directions, a user is able to view the display unit 321 installed at the rear portion of the guide robot 1 while moving along the guide robot 1. In other words, even if the guide robot 1 travels for directions, the user may easily view information displayed on the display unit 321 while following the guide robot 1.

In addition, the reason for positioning the display unit 321 in opposition to the garbage insertion part 33 is that the garbage insertion part 33 may be stained with foreign matters in the process of throwing garbage through the garbage insertion part 33 or the garbage stored in the trash can assembly 34 may produce bed odor.

Therefore, according to the present specification, to minimize the feeling of aversion against the foreign matters or the bed odor in the process that the user uses the display unit 321, the display unit 321 is spaced apart from the garbage insertion part 33 as far as possible.

Hereinafter, a direction will be defined. When viewed based on FIG. 1, a direction that the garbage insertion part 33 faces is defined as "forward direction". When viewed based on FIG. 2, a direction that the display unit 321 faces is defined as "rearward direction". In the present specification, the forward direction is a direction opposite to the rearward direction.

Meanwhile, the head part 40 is disposed above the body part 30. The head part 40 is coupled to an upper end portion of the body part 30 and is rotatably installed. The head part 40 is rotatable independently from the body part 30. The head part 40 may rotate at a predetermined angle in one direction (left direction) or an opposite direction (right direction). In this case, the head part 40 and the body part 30 may be connected with each other by a connection part 50.

A lower end portion of the connection part 50 may be fixed into the upper end portion of the body part 30 and an upper end portion of the connection part 50 may support the head part 40. However, in the head part 40, a head case 41 forming an outer appearance of the head part 40 rotates independently from the connection part 50. In other words, the head case 41 may be spaced apart from the connection part 50 by a predetermined distance without being contact with the connection part 50. Accordingly, in the state that the connection part 50 is stopped, only the head part 40 may rotate.

The head part 40 includes an operating unit (or interface device) 42. The operating unit 42 performs both a function of receiving a command from a user and a function of displaying service information. For example, the operating unit 42 may include a touch monitor to receive a touch input from the user. The touch monitor may include a touch panel configured to receive the input of the user and a display to display output information. The operating unit 42 may have a substantially circular or oval shape and may be disposed on the front surface of the head case 41.

In addition, the head part 40 further includes a speaker 43. The speaker 43 outputs, in the form of a voice, airport guide information. At least one speaker 43 may be provided, or preferably, two speakers 43 may be provided. For example, the speakers 43 may be disposed at opposite sides of the head case 41, respectively, while being spaced apart from each other.

In addition, the head part 40 may further include an emergency operation button 44. The emergency operation button 44 is to instantly stop the operation of the guide robot 1 when the guide robot 1 is stopped or is travelling. For example, the emergency operation button 44 may be positioned at the rear portion of the head case 41 such that the emergency operation button 44 is easily operated even if the guide robot 1 travels in the forward direction.

Figure 3:
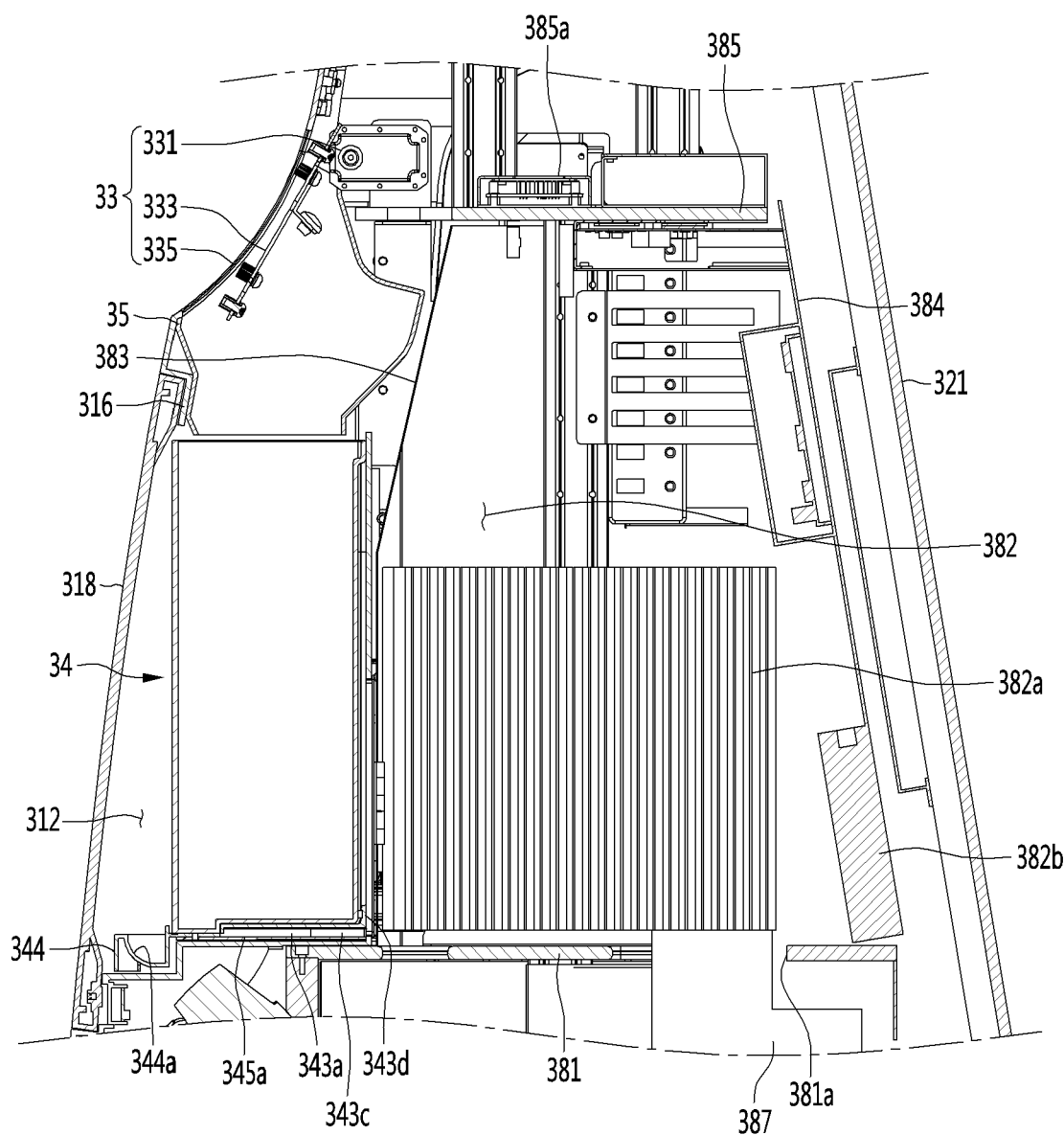
FIG. 3 is a longitudinal sectional view taken along line II-II' of FIG. 1.
Figure 4:
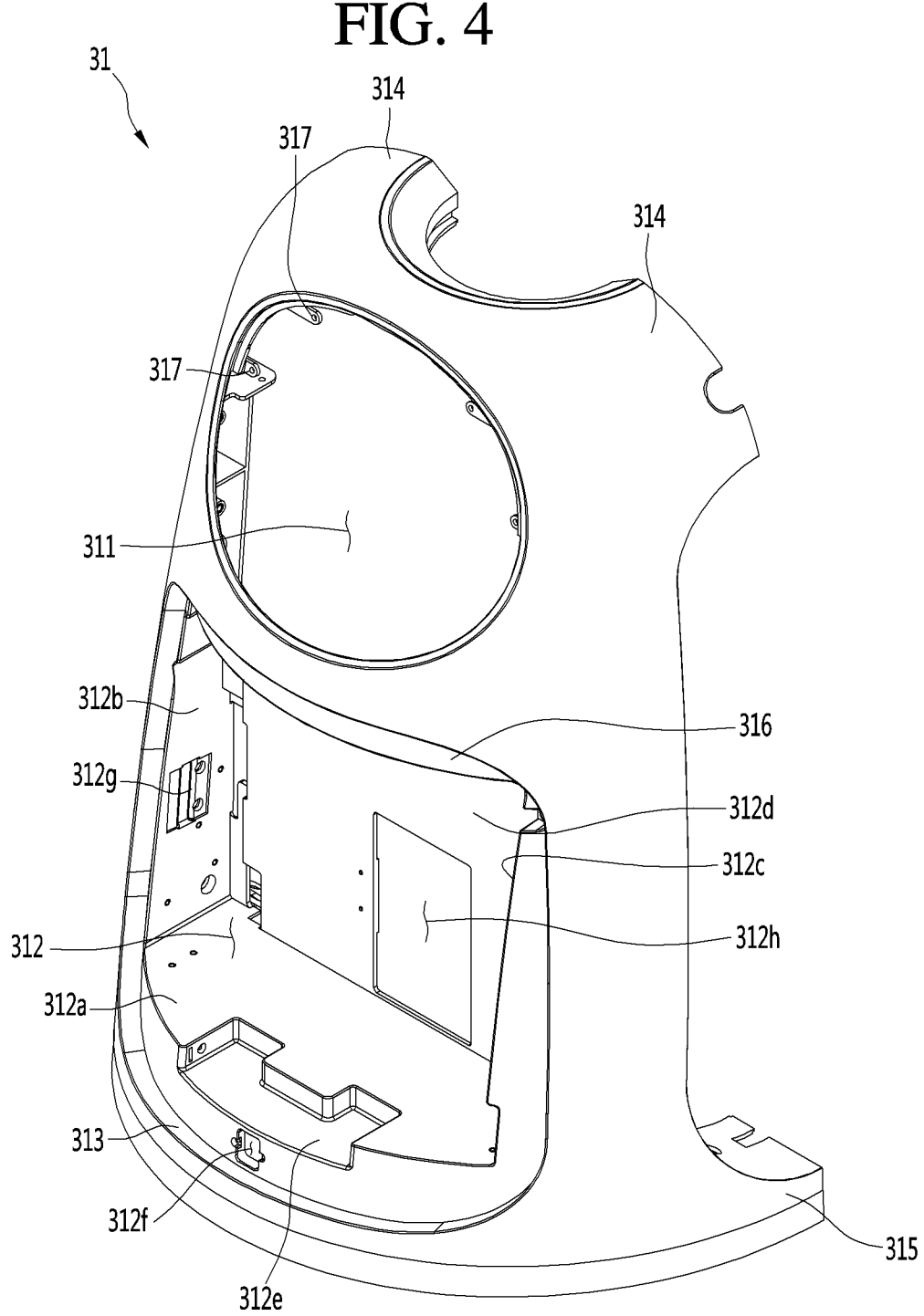
FIG. 4 is a front perspective view illustrating a front case according to an embodiment of the present specification.
Figure 5:
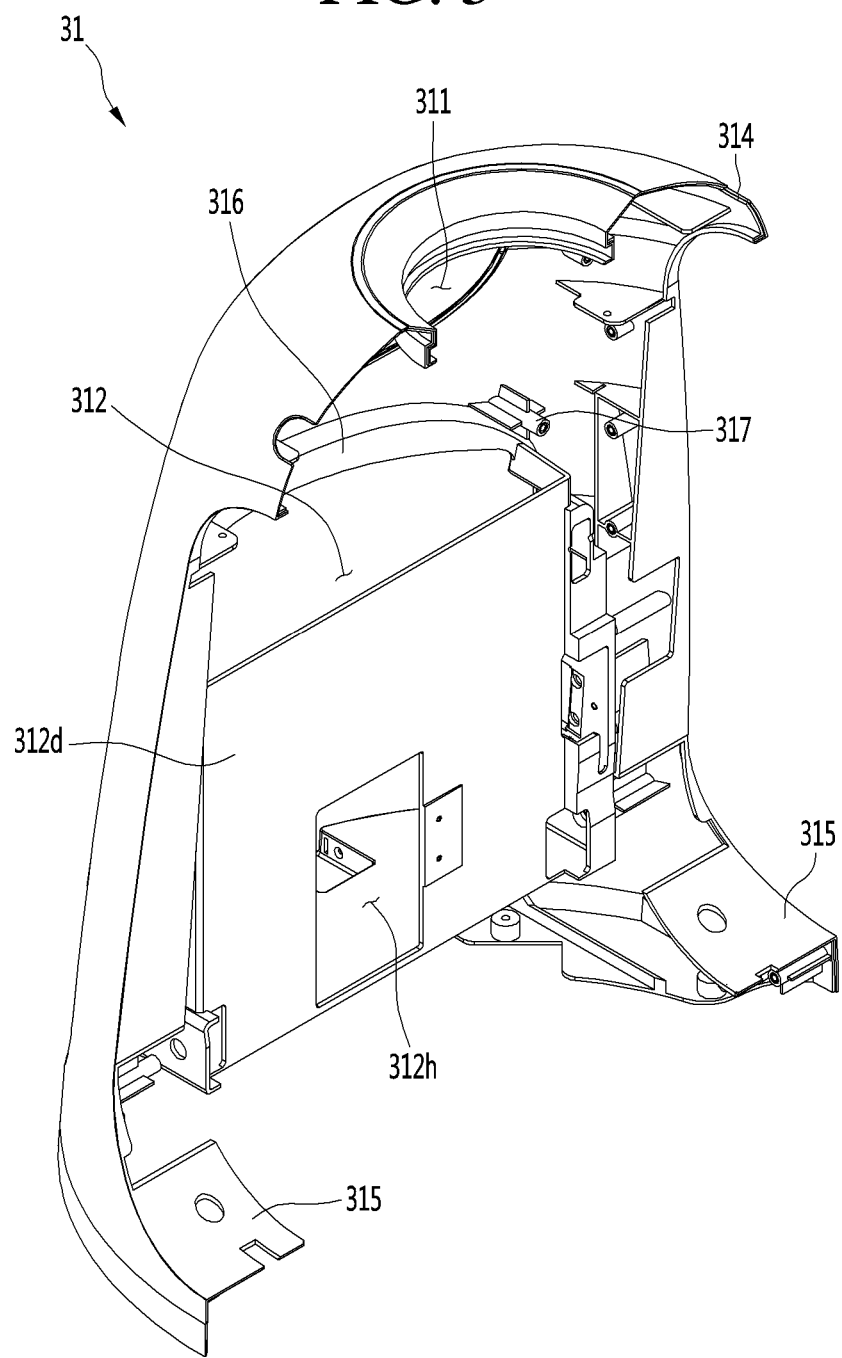
FIG. 5 is a rear perspective view illustrating a front case according to an embodiment of the present specification.

FIG. 3 is a longitudinal sectional view taken along line II-II' of FIG. 1, FIG. 4 is a front perspective view illustrating a front case according to an embodiment of the present specification, and FIG. 5 is a rear perspective view illustrating a front case according to an embodiment of the present specification. Referring to FIGS. 3 to 5, according to an embodiment of the present specification, the body part 30 includes a first horizontal frame (or first plate) 381 disposed inside the body case.

The first horizontal frame 381 may be disposed at an inner lower portion of the body case to support a plurality of parts. The first horizontal frame 381 may have the shape of a thin plate having a predetermined area. The first horizontal frame 381 may be horizontally disposed inside the body case.

In addition, the body part 30 may further include a first inner case 383 and a second inner case 384 to from an electronic part chamber 382 The first inner case 383 and the second inner case 384 may be collectively referred to as "inner case." The first inner case 383 and the second inner case 384 stand upright on the top surface of the first horizontal frame 381 to form the electronic part chamber 382 having a predetermined space therein.

The first inner case 383 may be mounted on a front edge of the top surface of the first horizontal frame 381 and the second inner case 384 may be mounted on a rear edge of the top surface of the first horizontal frame 381. In addition, the first inner case 383 is coupled to the second inner case 384 to form the electronic part chamber 382 therein.

For example, the first inner case 383 may be formed in the shape of a substantially C shape when viewed in a horizontal sectional surface and may have a top surface and a bottom surface which are open. In addition, the second inner case 384 may have a shape symmetrical to the first inner case 383. Accordingly, opposite end portions of the first inner case 383 are coupled to opposite end positions of the second inner case 384 to form the electronic part chamber 382. In this case, the upper end portion of the first inner case 383 and the upper end portion of the second inner case 384 may be coupled to each other horizontally to each other without a step difference therebetween.

The electronic part chamber 382 may include a control part 382a to control the overall operation of the guide robot 1 and a communication part 382b allowing the guide robot 1 to communicate with an external device. The control part 382a and the communication part 382b may be disposed on the top surface of the first horizontal frame 381 or may be fixed by a separate bracket.

In addition, the second body part 30 may further include a second horizontal frame (or second plate) 385 disposed inside the body case. The second horizontal frame 385 may be disposed at an inner upper portion of the body case to support a plurality of parts. The second horizontal frame 385 may have the shape of a thin plate having a predetermined area smaller than the area of the first horizontal frame 381. The second horizontal frame 385 may be horizontally disposed inside the body case.

In detail, the second horizontal frame 385 may be placed on the upper end portions of the first and second inner cases 383 and 384. The second horizontal frame 385 may be installed to shield the open top surfaces of the first and second inner cases 383 and 384. Through the above configuration, the electronic part chamber 382 may have a structure shielded by the first horizontal frame 381, the first and second inner cases 383 and 384, and the second horizontal frame 385. Accordingly, electromagnetic waves or noise produced by a plurality of electronic parts disposed in the electronic part chamber 382 may be effectively blocked.

The second horizontal frame 385 may be provided thereon with a control part 385a for the function of the guide robot 1. In addition, a driving motor assembly (or motor) 331 may be provided at a front edge of the second horizontal frame 385 to provide driving force for opening or closing the garbage insertion part 33.

One end of a cover frame 333 may be coupled the driving motor assembly 331, and the cover frame 333 may be moved due to a force generated by a rotation of the driving motor assembly 331. A second end of the cover frame 333 may be connected to one or more cover members (or covers) 335 positioned at the mounting opening 311, and the movement of the cover frame 333 may cause the cover members 335 to move to expose at least a portion of the mounting opening 311. For example, the cover members 335 may be hingedly connected to the front case 31, and the cover members 335 may rotate relative to the front case 331 due to the force applied to the cover frame 333 by the driving motor assembly 331. One or more of the driving motor assembly 331, cover frame 333, or the cover members 335 may be coupled to the front case 31 by coupling parts (or coupling ribs) 317.

The driving motor assembly 331 may selectively apply a force based on, for example, receiving an instruction from the user (e.g., from the operating unit 42) and/or based on detecting a presence of a user's hand by a sensor (not shown) within a threshold distance of the mounting opening 311. In another implementation, the driving motor assembly 331 may be omitted and the cover members 335 may be manually operated by a user by application of a user force.

Meanwhile, the trash can assembly 34 is disposed in front of the first inner case 383. The trash can assembly 34 is disposed in a storage chamber 312 provided by the front case 31. In addition, a garbage guide part 35 is disposed above the trash can assembly 34 to guide the movement of garbage inserted through the garbage insertion part 33.

The garbage insertion part 33 serves as an entrance for inserting garbage and is disposed at the upper portion of the body part 30, that is, the upper portion of the front case 31. In addition, the trash can assembly 34 contains garbage introduced through the garbage insertion part 33 and is disposed under the garbage insertion part 33.

The garbage insertion part 33 is provided to shield the mounting opening 311 formed in the outer surface of the front case 31 to open or close a portion of the mounting opening 311. In other words, the garbage insertion part 33 opens or closes the mounting opening 311 to provide an inlet for inserting garbage.

In this case, at least a portion of the garbage insertion part 33 is open by rotating outward of the front case 31 through hinge coupling. Unlike, at least a portion of the garbage insertion part 33 may be open by rotating inward of the front case 31 without rotating outward of the front case 31. In addition, the rotation direction or the rotation angle of the garbage insertion part 33 may be variously designed.

For example, when the guide robot 1 receives a command of starting insertion of garbage from a user, the garbage insertion part 33 may be rotated to face the user. In addition, the guide robot 1 may open the garbage insertion part 33 to induce the user to insert garbage therein. Thereafter, when a predetermined time elapses or a command of terminating the insertion of the garbage is received, the guide robot 1 may close the garbage insertion part 33. However, the present specification is not limited thereto, and various scenarios may be applied for opening the garbage insertion part 33.

Meanwhile, the trash can assembly 34 is disposed inside the body part 30 and, in detail, is seated in the storage chamber 312 formed in the front case 31. The trash can assembly 34 may be positioned under the garbage insertion part 33 and may have, for example, a sealed shape that the top surface of the trash can assembly 34 is open. In other words, the garbage inserted through the garbage insertion part 33 may pass through the garbage guide part 35 and be dropped through the opened top surface of the trash can assembly 34.

The garbage guide part 35 guides garbage inserted through the garbage insertion part 33 such that the garbage is easily dropped into the trash can assembly 34. The garbage guide part 35 is interposed between the garbage insertion part 33 and the trash can assembly 34.

In this case, a lower portion of the garbage guide part 35 may be disposed to overlaps with an upper portion of the trash can assembly 34 in a vertical direction. In addition, at least a portion of the upper portion of the garbage guide part 35 may be connected with at least a portion of the lower portion of the garbage insertion part 33. Accordingly, the garbage inserted through the garbage insertion part 33 may be prevented from being out of the trash can assembly 34.

Hereinafter, the front case 31 according to an embodiment of the present specification will be described in detail. The front case 31 is a part forming the front outer appearance of the body part 30, and the trash can assembly 34 is mounted in the front case 31. The front case 31 may be coupled to the rear case 32 forming the rear outer appearance of the body part 30. In addition, when the front case 31 is coupled to the rear case 32, the front case 31 and the rear case 32 form a cylindrical shape becoming slimmer upward.

In detail, a door mounting part 313 is formed in the front case 31 to mount the main door 318. The door mounting part 313 is formed by recessing the front case 31 by a predetermined depth rearward from the front surface of the front case 31. The door mounting part 313 may be shielded by the main door 318, and at least a portion of the door mounting part 313 may be open or closed by opening or closing the main door 318.

In addition, the front case 31 is formed therein with the mounting opening 311 in which the garbage insertion part 33 is mounted and the storage chamber 312 in which the trash can assembly 34 is mounted. The mounting opening 311 is positioned above the door mounting part 313, and the storage chamber 312 is positioned inside the door mounting part 313. In other words, the mounting opening 311 may be positioned above the storage chamber 312.

At least a portion of the mounting opening 311 may be open or closed by the garbage insertion part 33. Accordingly, the garbage inserted through the garbage insertion part 33 may be easily dropped into the trash can assembly 34 positioned under the garbage insertion part 33.

The storage chamber 312 may be formed to be recessed rearward from the front surface of the front case 31. In detail, the storage chamber 312 may be formed as at least a portion of the door mounting part 313 is further recessed. The storage chamber 312 provides a space in which the trash can assembly 34 is detachably mounted.

For example, the storage chamber 312 may have a hexahedral space, the front surface and the top surface of which are open. According to the present embodiment, the storage chamber 312 may include a bottom surface 312a, and a first lateral side 312b, a second lateral side 312c, and a rear surface 312d connected with the bottom surface 312a.

When viewed based on FIG. 4, the first lateral side 312b refers to a left sidewall of the storage chamber 312 and the second lateral side 312c refers to a right sidewall of the storage chamber 312. The first lateral side 312b and the second lateral side 312c may face each other.

The rear surface 312d of the storage chamber 312 may be injection-molded integrally with the front case 31. In addition, alternatively, the rear surface 312d of the storage chamber 312 may be provided by coupling a rear portion of the front case 31 with a separate partition plate. In this case, the separate partition plate may be mounted detachably from the rear portion of the front case 31. Accordingly, since the partition plate forming the rear surface 312d of the storage chamber 312 is additionally separated, the inner part of the storage chamber 312 may be easily cleaned up.

The bottom surface 312a of the storage chamber 312 has a seating groove 312e in which the lower portion of the trash can assembly 34 is seated. The seating groove 312e may be recessed by a predetermined depth from the bottom surface 312e of the storage chamber 312.

In addition, a sensor groove 312f is formed under the seating groove 312e such that a door sensor (not illustrated) is installed in the sensor groove 312f to sense the opening or closing of the door 318. The sensor groove 312f may be disposed adjacent to the door mounting part 313.

The first lateral side 312b of the storage chamber 312 is formed therein with a coupling hole 312g coupled to a sensor bracket for mounting a sensing member to sense an amount of garbage stored in the trash can assembly 34. Similarly, the second lateral side 312c of the storage chamber 312 is formed therein with a coupling hole (not illustrated) coupled to a sensor bracket for mounting a sensing member to sense an amount of garbage stored in the trash can assembly 34.

The rear surface 312d of the storage chamber 312 is formed therein with a door opening 312h for mounting a sub-door to be described below. The door opening 312h may be interpreted as a communication passage to allow the storage chamber 312 to communicate with the electronic part chamber 382.

In addition, the front case 31 further includes case coupling parts 314 and 315 formed as portions of front edges extend in the rearward direction. The case coupling parts 314 and 315, which are coupled to the rear case 32, may be formed at the edge of the front case 31. The case coupling parts 314 and 315 include a pair of upper coupling parts 314 positioned at the upper portion of the front case 31 and a pair of lower coupling parts 315 positioned at the lower portion of the front case 31. The pair of upper coupling parts 314 and the pair of lower coupling parts 315 may be coupled to a plurality of coupling parts (not illustrated) extending from the rear case 32.

In addition, the front case 31 further includes a step part (or step) 316 for inserting the garbage guide part (or guide) 35. The step part 316 may be formed as the upper edge of the door mounting part 313 is recessed reward. Alternatively, the step part 316 may be formed as the rear surface of the front case 31 extends reward.

In other words, the step part 316 may have a form of protruding rearward from the front case 31. For example, although the step part 316 has a curved shape, the present specification is not limited thereto. The garbage guide part 35 may be inserted into the step structure of the step part 316 or locked and fixed to the step shape of the step part 316.

Figure 6:
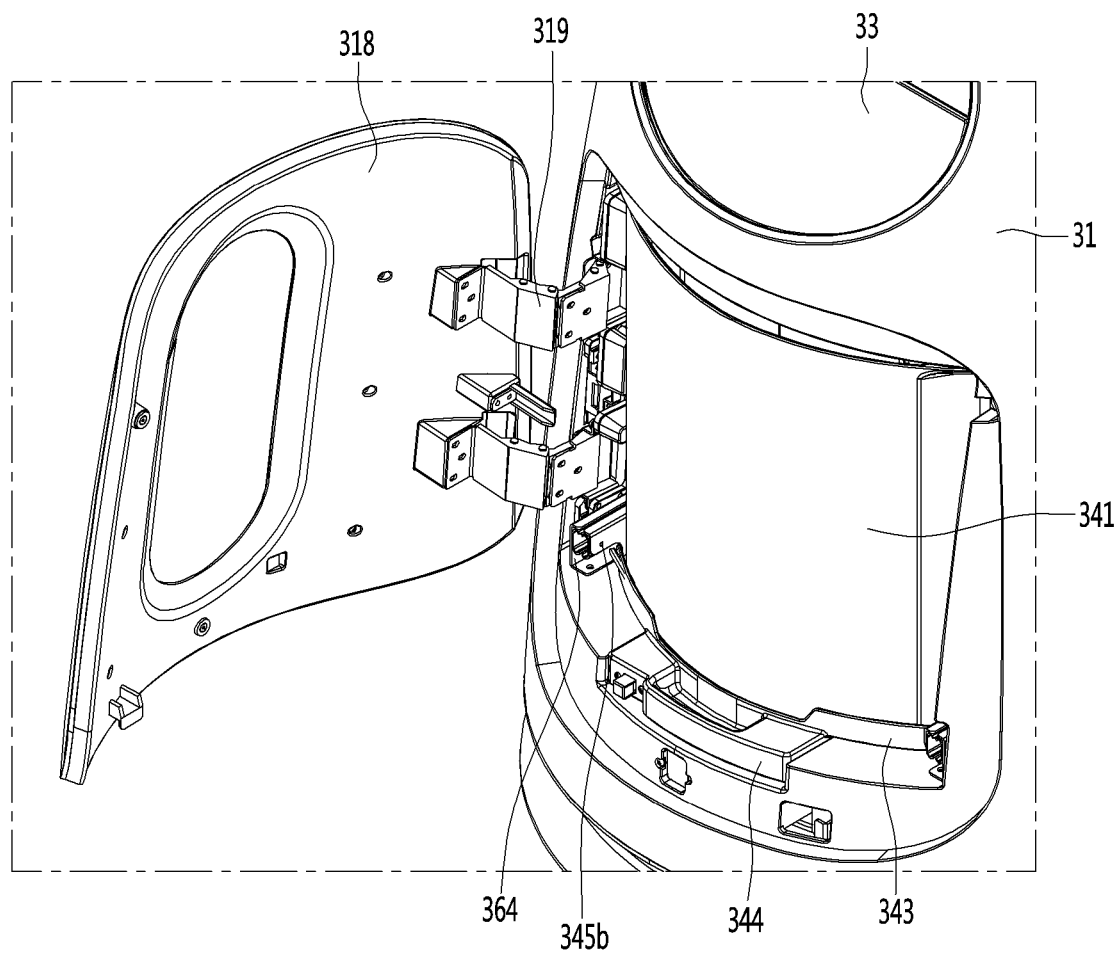
FIG. 6 is a view illustrating a body part having a main door, which is open according to an embodiment of the present specification.
Figure 7:
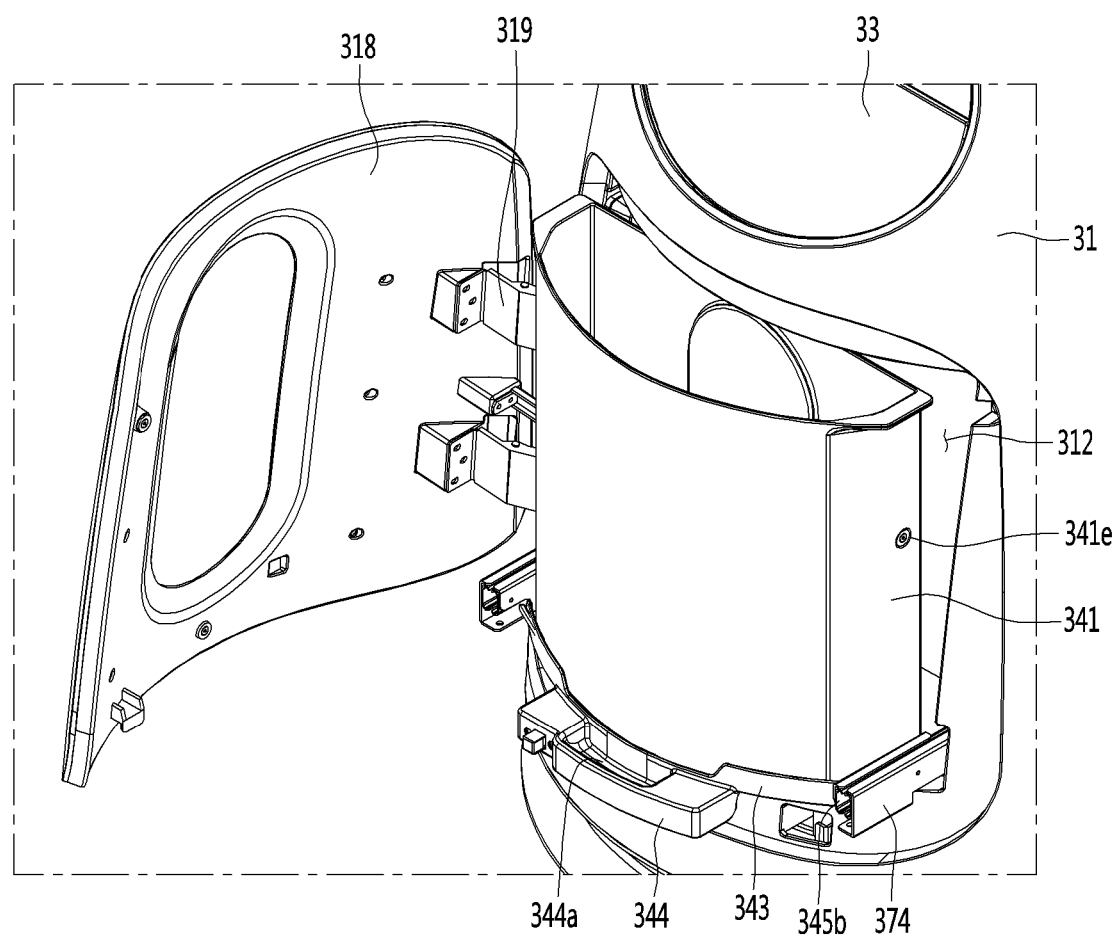
FIG. 7 is a view illustrating that a trash can assembly is withdrawn from a storage chamber according to an embodiment of the present specification.
Figure 8:
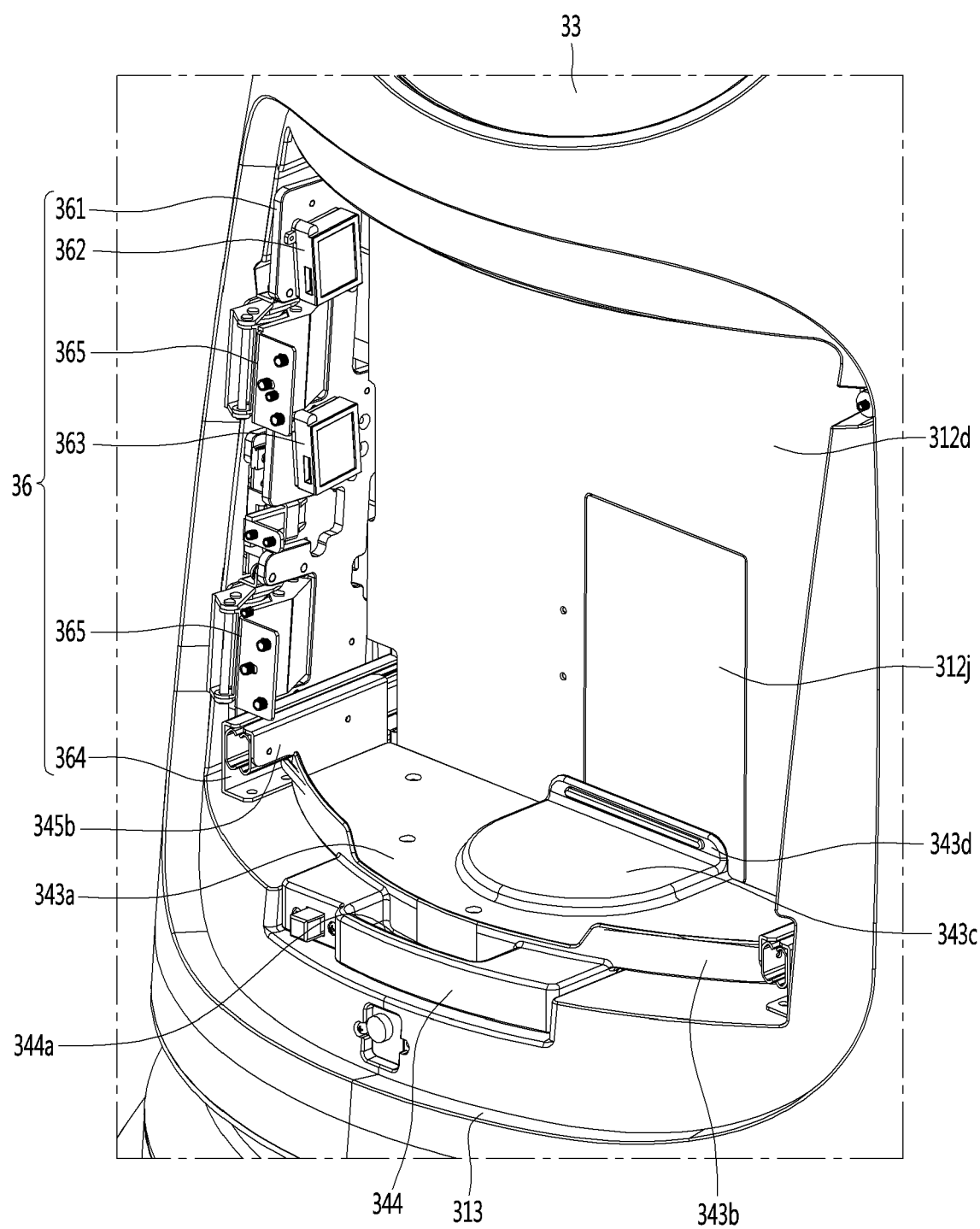
FIG. 8 is a view illustrating the storage chamber according to an embodiment of the present specification.
Figure 9:
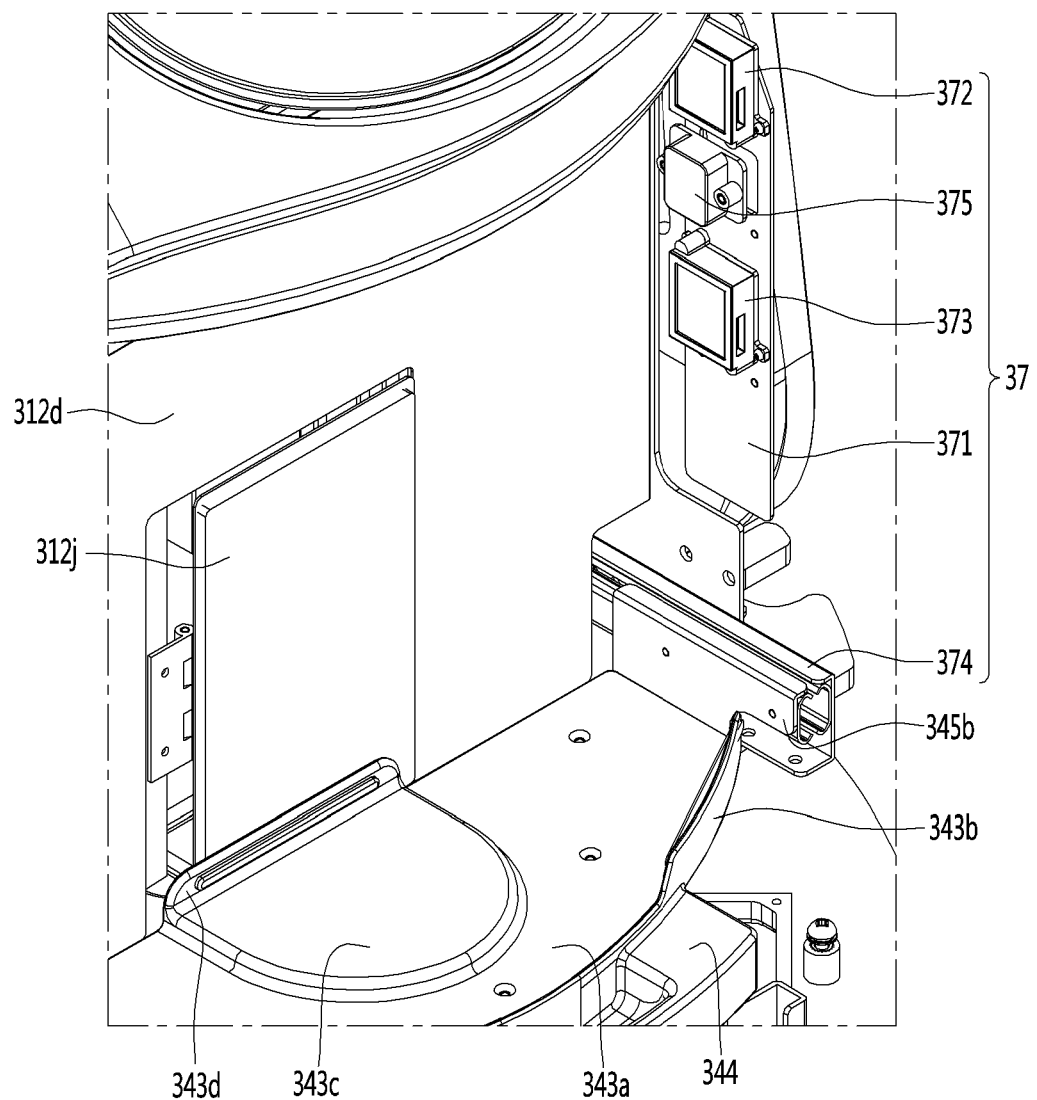
FIG. 9 is a view illustrating the storage chamber viewed in another direction according to an embodiment of the present specification.
Figure 10:
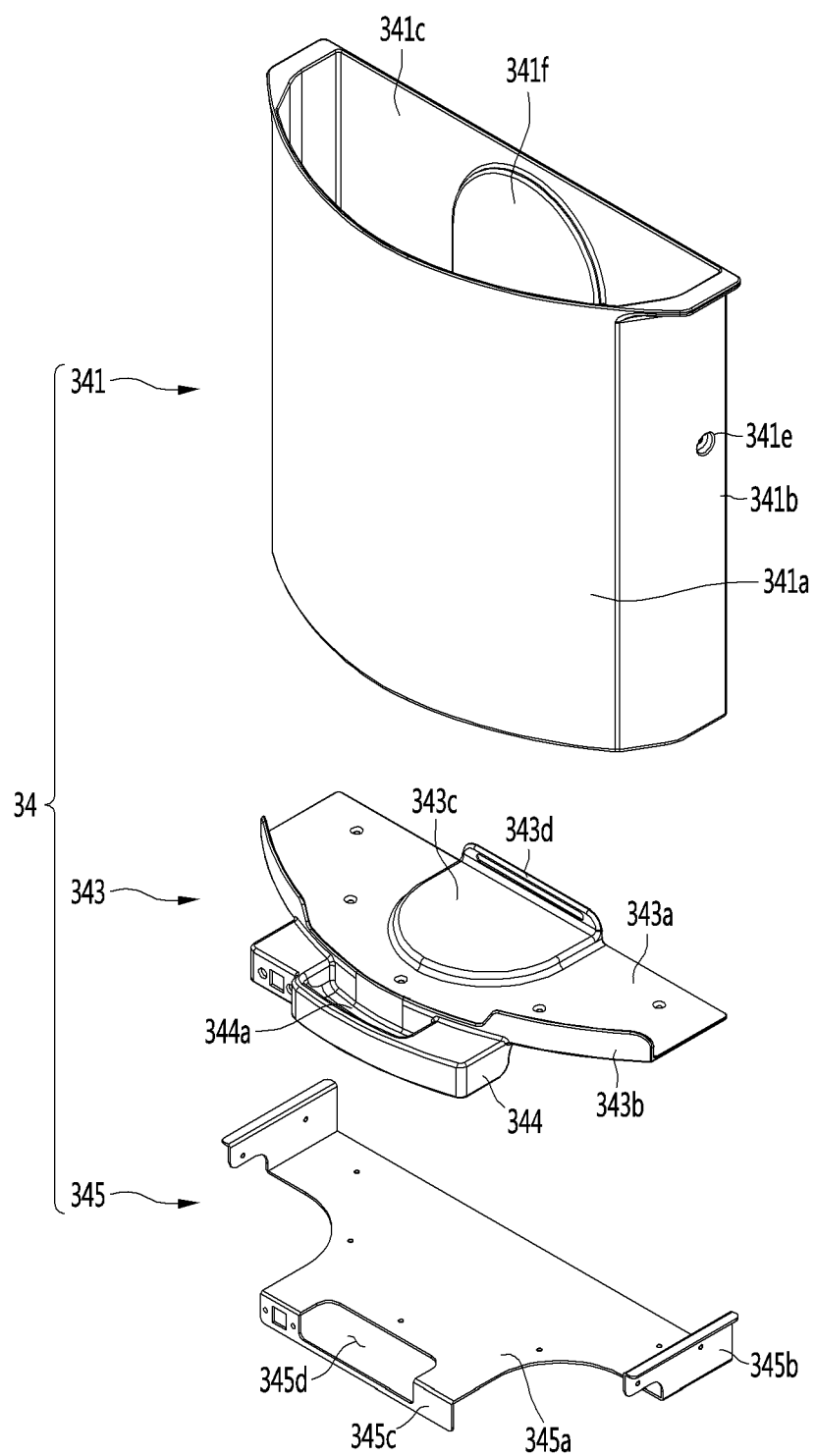
FIG. 10 is an exploded perspective view of a trash can assembly according to an embodiment of the present specification.
Figure 11:
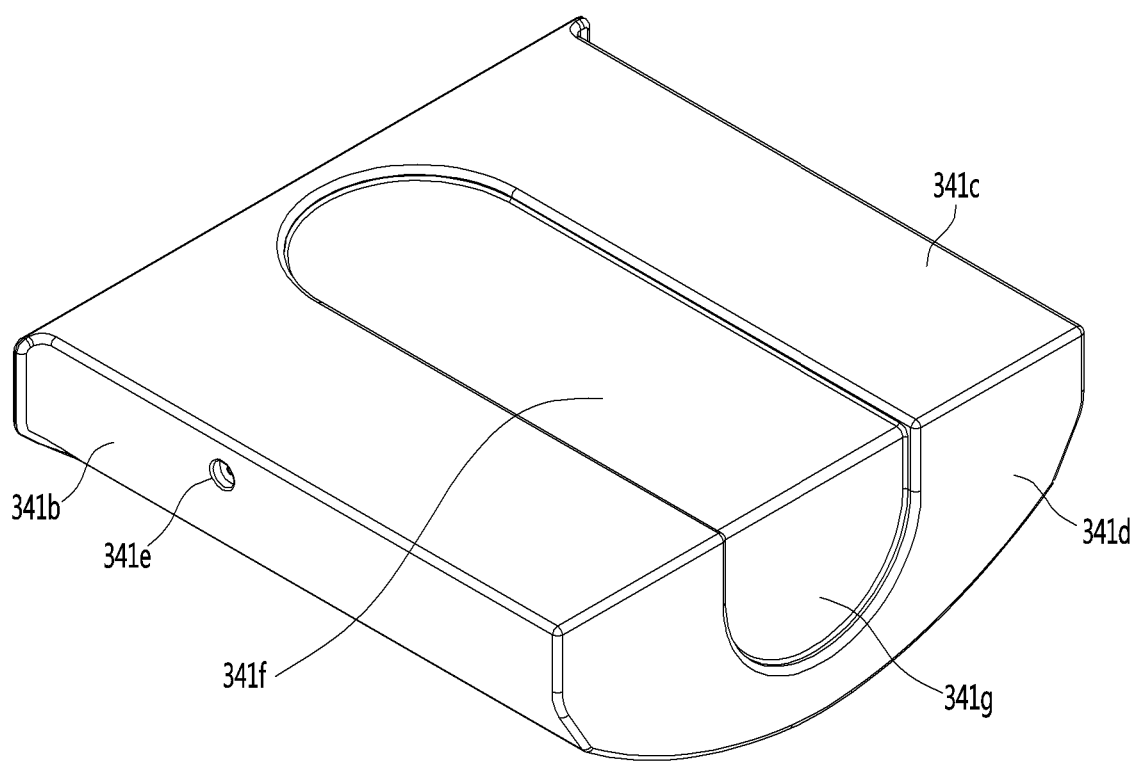
FIG. 11 is a view illustrating a garbage storage part viewed in another direction according to an embodiment of the present specification.

FIG. 6 is a view illustrating a body part having a main door, which is open according to an embodiment of the present specification, FIG. 7 is a view illustrating that a trash can assembly is withdrawn from a storage chamber according to an embodiment of the present specification, FIG. 8 is a view illustrating the storage chamber according to an embodiment of the present specification, FIG. 9 is a view illustrating the storage chamber viewed in another direction according to an embodiment of the present specification, FIG. 10 is an exploded perspective view of a trash can assembly according to an embodiment of the present specification, and FIG. 11 is a view illustrating a garbage storage part viewed in another direction according to an embodiment of the present specification.

Referring to FIGS. 6 to 10, the main door 318 is mounted on the door mounting part 313 formed in the front case 31 and coupled to a hinge coupling part (or hinge) 319 coupled to an inner part of the storage chamber 312. Accordingly, as the main door 318 is open or closed, the storage chamber 312 may be selectively shielded.

When the main door 318 is open, the trash can assembly 34 is exposed to the outside and a user may separate the trash can assembly 34. In detail, the trash can assembly 34 includes a garbage storage part (or bin) 341 to store garbage, a mounting part (or mounting plate) 343 to mount the garbage storage part 341, and a bracket 345 to support the mounting part 343.

The garbage storage part 341 has a polyhedral shape having a top surface which is open. The garbage storage part 341 may be provided in a sealed form and may be placed right under the garbage guide part 35. For example, the garbage storage part 341 includes a front surface 341a formed to be rounded, a pair of lateral sides 341b extending rearward from opposite sides of the front surface 341a, a rear surface 341c connecting the pair of lateral sides 341b with each other, and a bottom surface 341d connecting lower end portions of the front surface 341a, the pair of lateral sides 341b, and the rear surface 341c.

The bottom surface 341d of the garbage storage part 341 includes a bottom surface recess part 341g having a predetermined area such that the bottom surface 341d is stably placed on a mounting part (or mounting plate) 343 to be described later. The bottom surface recess part (or bottom surface recess) 341g may be interpreted as a part inserted into the insertion part (or protrusion) 343c protruding from the top surface of the mounting part 343.

The bottom surface recess part 341g is recessed by a predetermined depth from the center of the bottom surface 341d of the garbage storage part 341. The bottom surface recess part 341g may be formed by extending to the rear end portion of the bottom surface 341d of the garbage storage part 341.

The rear surface 341c of the garbage storage part 341 includes a rear surface recess part 341f having a predetermined area such that the rear surface 341d is stably placed on the mounting part 343. The rear surface recess part 341f may be interpreted as a part into which a rear rib 343d formed on the insertion part 343c is inserted.

The rear surface recess part 341f may be formed by extending from an upper end portion of the rear surface 341c of the garbage storage part 341 to a lower end portion of the rear surface 341c. In this case, the rear surface recess part 341f may be connected with the bottom surface recess part 341g. In other words, a lower end portion of the rear surface recess part 341f may be connected with a rear end portion of the bottom surface recess part 341g.

In addition, a magnet 341e may be provided on the lateral side 341b of the garbage storage part 341. The magnet 341e may be mounted in a groove formed in one side of the lateral side 341b. The magnet 341e is a component sensed by a sensing member to be described later, and is provided to determine whether the garbage storage part 341 is properly installed in a correct position. The magnet 341e may be provided on at least one of the opposite lateral sides 341b of the garbage storage part 341.

The mounting part 343, which is provided in the form of supporting the bottom surface 341g of the garbage storage part 341, may support the garbage storage part 341. The mounting part 343 may be, for example, formed in a fan shape. In detail, the mounting part 343 includes a seating surface 343a forming a plane on which the garbage storage part 341 is seated. The seating surface 343a may have the form of a fan-shape plate.

In addition, the mounting part 343 further includes a guide rib 343b extending upward from the seating surface 343a. The guide rib 343b extends upward from a portion of an edge of the seating surface 343a to guide the mounting position of the garbage storage part 341.

At least one of the guide ribs 343b may be formed on the front end portion of the seating surface 343a. For example, the guide ribs 343b may be formed on opposite sides of the front end portions of the seating surface 343a while being spaced apart from each other. In addition, when the garbage storage part 341 is seated on the seating surface 343a, the guide rib 343b may make contact with the front surface 341a of the garbage storage part 341.

In addition, the mounting part 343 further includes an insertion part (or mounting protrusion) 343c inserted into a portion of the garbage storage part 341. The insertion part 343c is formed as a portion of the top surface of the seating surface 343a protrudes upward. For example, the insertion part 343c may protrude with a predetermined area from the central point of the seating surface 343a and may be inserted into the bottom surface 341g of the garbage storage part 341. In other words, when the garbage storage part 341 is seated on the seating surface 343a, the bottom surface recess part (or bottom surface recess) 341g may be inserted into the insertion part 343c and mounted.

In addition, the mounting part 343 may further include the rear rib 343d to support the rear surface of the garbage storage part 341. The rear rib 343d may be formed at a rear end portion of the insertion part 343c. For example, the rear rib 343d may protrude in a straight line along the rear end portion of the insertion part 343c. In addition, when the garbage storage part 341 is seated on the seating surface 343a, the guide rib 343d may be inserted into the rear surface recess part 341f of the garbage storage part 341.

Accordingly, through the above structure, even if vibration or shaking occurs in the state that the garbage storage part 341 is seated on the seating surface 343a, the garbage storage part 341 may be prevented from being collapsed or detached.

In addition, the mounting part 343 further includes a grip part (or handle) 344. The grip part 344 is formed by further extending in the forward direction from the front surface of the mounting part 343. The grip part 344 may be interpreted as a component to easily withdraw the garbage storage part 341 received in the storage chamber 312. To this end, the grip part 344 may have a grip groove 344a which may be gripped by fingers of a user.

The grip groove 344a is formed as a portion of the top surface of the grip part 344 extends downward. In addition, the recess part is inserted into an insertion groove 345d of the bracket 345 to be described later.

The bracket 345 may support the mounting part 343 and may be provided to withdraw the trash can assembly 34 at a time. The bracket 345 may be disposed on the bottom surface 312a of the storage chamber 312. In detail, the bracket 345 may include a base 345a to support the mounting part 343 and a pair of rail guides 345b provided at opposite sides of the base 345a.

The base 345a is placed horizontally to the bottom surface 312a of the storage chamber 345a and the pair of rail guides 345b extend upward from opposite end portions of the base 345a. The pair of rail guides 345b longitudinally extend in forward and rearward directions and are coupled to a pair of rail assemblies 374 described later. Therefore, the rail guide 345b provided on the bracket 345 may slide in the forward and backward directions along the rail assembly 374. Through the above configuration, the user may easily withdraw the garbage storage part 341 through the grip part 344 after opening the main door 318. Accordingly, the user may easily empty garbage stored in the garbage storage part 341.

Further, the bracket 345 may further include a bending part (or downward protrusion) 345c bent downward from the base 345a. The bending part 345c, which is a part bent downward from the front end portion of the base 345a, supports the grip part 344. In other words, when the mounting part 343 is seated on the bracket 345, a portion of the grip part 344 may be supported by being locked to a portion of the bending part 345c.

In this case, the insertion groove 345d is interposed between the front end portion of the base 345a and the bending part 345c, and the recess part of the grip part 344 may be inserted into the insertion groove 345d.

In addition, the body part 30 may further include sensor bracket assemblies 36 and 37 in which a plurality of sensors are mounted. The sensor bracket assemblies 36 and 37 may be provided inside the storage chamber 312. In detail, the sensor bracket assemblies 36 and 37 are provided in pair and may be mounted on opposite lateral sides 312b and 312c of the storage chamber 312, respectively.

According to the present embodiment, the sensor bracket assemblies 36 and 37 may include a first sensor bracket assembly 36 mounted on the first lateral side 312b of the storage chamber 312, and a second sensor bracket assembly 37 mounted on the second lateral side 312c of the storage chamber 312. In more detail, the first and second sensor bracket assemblies 36 and 37 include first and second sensor brackets 361 and 372 having the plate shape and longitudinally extending in a vertical direction.

The first sensor bracket 361 is fixed to the first lateral side 312b of the storage chamber 312 and the second sensor bracket 371 is fixed to the second lateral side 312c of the storage chamber 312. For example, the first and second sensor brackets 361 and 371 may be fixed on the side surfaces of the storage chamber 312 by coupling members.

In addition, the first and second sensor bracket assemblies 36 and 37 further include first sensing members (or first sensors) 362 and 372 to sense an amount of garbage stored in the garbage storage part 341. The first sensing members 362 and 372 include Time of Flight (TOF) type sensors to sense an amount of garbage stored in the garbage storage part 341. In other words, the first sensing members 362 and 372 may sense an amount of garbage filled in the garbage storage part 341 by using time taken until the first sensing members 362 and 372 receive a signal of infrared light, an ultrasonic wave, or a laser after transmitting the signal.

The first sensing members 362 and 372 include a first transmitter 362 to transmit the signal and a first receiver 372 spaced apart from the first transmitter 362 to receive the signal of the first transmitter 362. In detail, the first transmitter 362 is mounted on the first sensor bracket 361 and the first receiver 372 is mounted on the second sensor bracket 371. The first transmitter 362 and the first receiver 372 may be provided to face each other.

Each of the first transmitter 362 and the first receiver 372 may be disposed above a line of dividing each of the first sensor bracket 361 and the second sensor bracket 371 into two parts in a vertical direction. According to another aspect, each of the first transmitter 362 and the first receiver 372 may be disposed in a sensor bracket corresponding to an upper part about a line of dividing the garbage storage part 341 into two parts in the vertical direction.

According to the present embodiment, the first transmitter 362 and the first receiver 372 may be mounted at a height corresponding to 80% of the height of the upper most end of the garbage storage part 341. This is necessary to generate a signal for empting the garbage storage part 341, when garbage is filled to some degree in the garbage storage part 341.

In addition, the first and second sensor bracket assemblies 36 and 37 further include second sensing members 363 and 373 to more exactly determine an amount of garbage stored in the garbage storage part 341. The second sensing members (or second sensors) 363 and 373 may be interpreted as the same as the first sensing members 362 and 372. However, the second sensing members 363 and 373 are characterized in that the second sensing members 363 and 373 are mounted to be lower than the first sensing members 362 and 372.

According to the present embodiment, for example, the second sensing members 363 and 373 may be mounted at the height corresponding to 50% of the height of the upper most end of the garbage storage part 341. This is necessary to determine a situation that a large foreign substance is caught and sensed at an upper space of the garbage storage part 341 in the state that the garbage is not filled in the lower space of the garbage storage part 341.

In other words, generally, if garbage is started to be filled in the garbage storage part 341, an amount of garbage is sensed by the second sensing members 363 and 373 and then sensed by the first sensing members 362 and 372. However, when an amount of garbage is sensed only by the first sensing members 362 and 372 without sensing the amount of garbage by the second sensing members 363 and 373, it may be determined that the sensors are failed or the foreign substance is caught.

Through the above component, an amount of garbage stored in the garbage storage part 341 may be more exactly sensed and the failure of the sensor or the caught foreign substance may be determined. Accordingly, the overflowing of the garbage or the failure of the sensor may be predicted in advance, so proper countermeasures may be made.

In addition, the first and second sensor bracket assemblies 36 and 37 may further include a pair of rail assemblies (or rail guides) 364 and 374 to guide the introduction and the withdrawal of the trash can assembly 34. The rail assemblies 364 and 374 may be provided at the lower end portions of the first and second sensor brackets 361 and 371. Accordingly, the rail guides 345b provided at opposite sides of the bracket 345 may slide in forward and rearward directions along the rail assemblies 364 and 374.

In addition, the first sensor bracket assembly 36 may further include a pair of hinge assemblies (or hinges) 365 hinged to the main door 318. The pair of hinge assemblies 365 is mounted on the first sensor bracket 361 such that the main door 318 is rotatable. In detail, each of the hinge assemblies 365 may be coupled to the first sensor bracket 361 at one side thereof and may be coupled to the hinge coupling part 319 of the main door 318 at an opposite side thereof.

The pair of hinge assemblies 365 may be disposed on the first sensor bracket 361 and may be spaced apart from each other in a vertical direction. In this case, the hinge assemblies 365 may be fixed on a surface opposite to the surface on which the first and second transmitters 362 and 363 are mounted. In other words, the first and second transmitters 362 and 363 are mounted on a surface, which faces the inner part of the storage chamber 312, of the first sensor bracket 361, and the pair of hinge assemblies 365 are mounted on a surface, which faces the first lateral side 312b of the storage chamber 312, of the first sensor bracket 361.

The hinge assembly 365 may be mounted based on the installation area of the first sensor bracket 361. In addition, the hinge assembly 365 may be configured without interfering with the sensing operations of the first and second transmitters 362 and 363.

In the present embodiment, one of the pair of hinge assemblies 365 may be interposed between the first transmitter 362 and the second transmitter 363, and a remaining one may be interposed between the second transmitter 363 and the rail assembly 364. Accordingly, through the above configuration, the available installation area of the first sensor bracket 361 may be efficiently utilized and the mutually interference in operation between parts may be minimized.

In addition, the second sensor bracket assembly 37 may further include a mounting sensor 375 to sense the mounting of the garbage storage part 341. The mounting sensor 375 may be mounted at one side of the second sensor bracket 371. In detail, the mounting sensor 375 may be mounted on a portion of the second sensor bracket 371 between the first receiver 372 and the second receiver 373.

The mounting sensor 375 is disposed adjacent to a lateral side of the garbage storage part 341. In the present embodiment, the mounting sensor 375 may be a Hall integrated circuit (IC) sensor (or Hall effect sensor). In other words, when the garbage storage part 341 is mounted in the mounting part 343, the mounting sensor 375 may determine whether the garbage storage part 341 is exactly mounted, by sensing a magnet (not illustrated) provided on a lateral side of the garbage storage part 341. In addition, when the garbage storage part 341 is not exactly placed, an alarm sound rings such that a user notices this. Accordingly, through the above configuration, since it may be determined that the garbage storage part 341 is placed at a proper position of the storage chamber 312, the garbage inserted through the garbage insertion part 33 may be prevented from being out of the garbage storage part 341.

Meanwhile, the body part 30 further includes a sub-door 312j provided inside the storage chamber 312. The sub-door 312j is mounted to open or close a door 312h formed in the rear surface 312d of the storage chamber 312. For example, the sub-door 312j is hinged to the rear surface 312d of the storage chamber 312 to be rotatably mounted.

In this case, when the sub-door 312j is open, the storage chamber 312 and the electronic part chamber 382 may communicate with each other. In other words, when the sub-door 312j is open, the first horizontal frame 381 is exposed to be accessible. In this case, a card may be charged with power by a supply unit of a card dispenser 387 through the opening 381a formed in the first horizontal frame 381. Through the above configuration, when the card is exhausted out of the supply unit of the card dispenser 387, cards may be supplied to the card dispenser 387 using the sub-door 312j.

The present specification has the following attributes produced by the guide robot. First, the trash can assembly is provided inside the guide robot, and the garbage insertion part is provided in an outer case corresponding to an upper portion of the trash can assembly. Accordingly, the garbage inserted through the garbage insertion part may be stably dropped into the trash can assembly by the self-load of the garbage.

Second, the trash can assembly is provided inside the front case forming the front outer appearance of the guide robot and the display unit is provided in the rear case forming the rear outer appearance of the guide robot. Accordingly, the trash can is not viewed to the outside, so aesthetics may be obtained. In addition, bed odor produced from the garbage stored in the trash can may be prevented from being escaped to the outside.

Third, the sensing member is provided in the storage chamber, in which the trash can assembly is received, to sense an amount of garbage stored in the trash can. Accordingly, the amount of garbage stored in the trash can may be more exactly sensed.

Fourth, the guide rib may be provided on the mounting part, in which the garbage storage part is mounted, to make contact with the garbage storage part. In addition, the recess part is formed in the outer surface of the garbage storage part, and the insertion part is formed on the mounting part to be inserted into the recess part. Accordingly, the garbage storage part may be guided to be stably supported and mounted at the correction position.

Fifth, the rail assembly is provided on the lateral side of the storage chamber, and the rail guide is provided on the bracket on which the mounting part is mounted. Accordingly, the trash can assembly may be easily withdrawn from the storage chamber at once.

In addition, the grip part is formed on the mounting part to extend in the forward direction from the front end portion of the mounting part and the grip groove is recessed in the grip part such that a person grips the grip part. Accordingly, the person may easily withdraw the trash can assembly.

Sixth, the garbage insertion part may be rotated to selectively open or close at least a portion of the mounting opening of the front case. Accordingly, the garbage insertion part is not open always, but open only in use. Accordingly, the use convenience may be improved and the bed odor produced from the garbage may be minimized.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The present specification is to provide a guide robot capable of easily collecting garbage by providing the function of a trash can to the robot, as well as a traveling function and a display function.

The present specification is to provide a guide robot in which garbage inserted into a garbage insertion part may be stably received in a trash can without a separate member. The present specification is to provide a guide robot capable of minimizing bed odor produced by garbage stored in a trash can while preventing the trash can from being viewed to the outside.

The present specification is to provide a guide robot capable of exactly sensing an amount of garbage stored in a trash can and notifying a user of the amount of garbage. The present specification is to provide a guide robot in which a trash can may be stably supported in a storage chamber, and may be easily withdrawn and detached from the storage chamber. The present specification is to provide a guide robot in which a garbage insertion part is selectively open, thereby improving use convenience and minimizing bed odor produced from the garbage.

According to an embodiment of the present specification, a guide robot includes a front case forming a front outer appearance of a body part and provided therein with a trash can assembly and a rear case forming a rear outer appearance of the body part and including the display unit.

In this case, a garbage insertion part to insert garbage into the trash can assembly is provided in a part, which corresponds to an upper portion of the trash can assembly, of the front case, so the garbage inserted into the garbage insertion part is stably dropped into the trash can assembly by the self-load of the garbage.

In addition, the front case may include a storage chamber to receive the trash can assembly therein and a main door to selectively open/close the storage chamber. Accordingly, the trash can is not viewed from the outside. Therefore, aesthetics may be improved and the bed odor produced from the garbage stored in the trash can is prevented from being escaped to the outside.

In addition, the storage chamber may include a bottom surface on which the trash can assembly is placed, opposite lateral sides, and a rear surface connecting the opposite lateral sides with the bottom surface, and a pair of sensor bracket assemblies may be provided on the opposite lateral sides, sensing members being mounted on the pair of sensor bracket assemblies to sense an amount of garbage stored in the trash can assembly.

In this case, the sensing member may include a transmitter to transmit a signal, and a receiver to receive a signal. The transmitter may be mounted on one sensor bracket assembly, and the receiver may be mounted on an opposite sensor bracket assembly facing the transmitter, thereby more exactly detecting an amount of garbage stored in the garbage storage part.

The trash can assembly may include a garbage storage part having a top surface, which is open, and having a sealed shape, a mounting part on which a bottom surface of the garbage storage part is mounted, and a bracket to support the mounting part.

In this case, a magnet may be provided on a lateral side of the garbage storage part, and a sensing member may be provided on a portion, which faces the magnet, of the sensor bracket assembly to sense the magnet, thereby determining whether the garbage storage part is mounted at a correct position.

Further, the mounting part may be provided thereon with a guide rib extending upward from an edge of a front end portion to make contact with a front surface of the garbage storage part. In addition, the mounting part may have an insertion part formed as a portion of a top surface of the mounting part protrudes upward, and the garbage storage part may be formed in an outer surface thereof with a recess part into which the insertion part is inserted.

In this case, the insertion part may further include a rear rib extending upward along a rear end portion of the insertion part, and the recess part may include a bottom surface recess part recessed from a bottom surface of the garbage storage part such that the insertion part is inserted into the bottom surface recess part and a rear surface recess part recessed from a rear surface of the garbage storage part such that the rear rib is inserted into the rear surface recess part. Accordingly, the mounting position of the garbage storage part may be guided while the garbage storage part is stably supported.

In addition, the pair of sensor bracket assemblies may include rail assemblies to guide forward and rearward movements, respectively, and rail guides are provided at opposite sides of the bracket and coupled to the rail assemblies to move in forward and rearward directions. Accordingly, the trash can assembly may be integrally withdrawn from the storage chamber, so a user may easily separate the trash can.

In addition, the mounting part may include a grip part extending in a forward direction from a front end portion thereof. The grip part may include a grip groove recessed to be gripped by a person. Accordingly, the user may easily withdraw the trash can assembly.

In addition, the body part may further include a garbage guide part to guide garbage, which is inserted through the garbage insertion part, to the trash can assembly, and the garbage guide part may be positioned above the trash can assembly inside the front case. Accordingly, the trash inserted through the garbage insertion part may be exactly received in the garbage storage part.

The garbage insertion part is rotated to selectively open or close at least a portion of a mounting opening of the front case. Accordingly, the garbage insertion part is not always open but open only in use, so the use convenience may be improved and the bed odor produced from the garbage may be minimized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A robot comprising:
a first housing, a wheel that rotates to move the robot being provided at the first housing; and
a second housing coupled to the first housing, a bin and a display being provided at the second housing,
wherein the second housing includes:
a first case forming an outer appearance of the second housing in a first horizontal direction, the bin being provided in the first case; and
a second case forming an outer appearance of the second housing in a second horizontal direction that differs from the first horizontal direction, the display being provided at the second case, wherein the first case includes:
a storage chamber to receive the bin therein;
a main door to selectively open or close the storage chamber; and
a slot positioned at a location corresponding to an opening of the bin such that garbage inserted into the slot is received in an interior of the bin,
wherein the robot further comprises:
a mounting plate on which a bottom surface of the bin is received; and
a support bracket to receive the mounting plate,
wherein the mounting plate includes:
an insertion protrusion that extends upward from a top surface of the mounting plate; and
a rear rib extending upward along a rear end of the insertion protrusion,
wherein the bin includes a recess formed in one or more outer surfaces thereof to receive the insertion protrusion,
wherein the recess includes:
a bottom surface recess recessed from a bottom surface of the bin such that the insertion protrusion is received in the bottom surface recess; and
a rear surface recess recessed from a rear surface of the bin such that the rear rib is received in the rear surface recess,
wherein the support bracket includes:
a base that supports a bottom surface of the mounting plate; and
a pair of rail guides that are disposed at opposite sides of the base and extend in forward and rearward directions to guide a movement of the support bracket in the forward and rearward directions,
wherein a pair of sensor brackets are disposed into the storage chamber,
wherein the pair of sensor brackets include a pair of rail assemblies to receive the pair of rail guides,
wherein the storage chamber is formed as a portion of a first surface of the first case that is recessed rearward,
wherein the bin is detachably mou storage chamber,
wherein the storage chamber includes a bottom surface on which the bin is placed, opposing lateral sides and a rear surface connected to the lateral sides and the bottom surface, and
wherein the pair of sensor brackets are provided on the opposite lateral sides, and one or more first sensors are mounted on the pair of sensor brackets to sense an amount of garbage in the bin.

2. The robot of claim 1, wherein one of the first sensors includes:
a transmitter to transmit a signal; and
a receiver to receive a signal,
wherein the transmitter is mounted on one of the sensor brackets, and
wherein the receiver is mounted on another one of the sensor brackets and positioned to face the transmitter.

3. The robot of claim 2, wherein one of the first sensors is positioned at first height on the pair of sensor brackets, and
wherein another of the first sensors is positioned at a second height on the pair of sensor brackets, the second height being lower than the first height such that the one of the first sensor at the first height detects when at least a first amount of garbage is received in the bin, and the another of the first sensor at the second height detects when at least a second amount of garbage is received in the bin, the first amount being greater than the second amount.

4. The robot of claim 1, wherein a magnet is provided on a lateral side of the bin, and
wherein a second sensor mounted on one of the sensor brackets detects when the bin is mounted on the mounting plate based on detecting the magnet.

5. The robot of claim 1, wherein the mounting plate includes a guide rib extending upward from an edge of a front end to contact a front surface of the bin.

6. The robot of claim 1, wherein the mounting plate includes a handle extending in a forward direction from a front end thereof, and
wherein the handle includes a grip groove recessed to be gripped by a person.

7. The robot of claim 1, wherein the second housing further includes a chute to guide garbage, which is inserted through the slot, to the bin, and
wherein the chute is positioned above the bin inside the first case.

8. The robot of claim 7, wherein a cover is rotatably coupled to the first case to selectively open or close at least a portion of the slot of the first case.

9. The robot of claim 8, further comprising:
a motor to generate a force; and
a cover frame connected with the motor to receive the force,
wherein the cover is coupled to the cover frame and is configured to move based on whether the force applied to the cover frame.

10. The robot of claim 9, wherein further comprising:
a first horizontal frame received in the second housing;
an inner case provided on the first horizontal frame to form an electronic part chamber; and
a second horizontal frame placed on an upper end of the inner case, and
wherein the motor is provided on a top surface of the second horizontal frame.

11. The robot of claim 1, further comprising;
a third case rotatably coupled to an upper region of second case, wherein a touch screen device is provided in the third case and is oriented to output visual content in a first horizontal direction corresponding to the slot and different from a second horizontal direction associated with an output of the display.

12. The robot of claim 1, wherein the pair of sensor brackets include a pair of hinge assemblies hinged to the main door.

13. The robot of claim 12, wherein the pair of hinge assemblies are coupled to one of the pair of sensor brackets.

14. A robot comprising:
a first housing, a wheel that rotates to move the robot being provided at the first housing; and
a second housing provided over the first housing, a bin and a display being provided in the second housing,
wherein the second housing includes:
a slot positioned at a location corresponding to an upper region of the bin such that garbage inserted into the slot is received in the bin;
a storage chamber to receive the bin therein; and
a main door to selectively open or close the storage chamber,
wherein the slot opens in a first horizontal direction that differs from a second horizontal direction associated with an output of the display,
wherein the robot further comprises:
a mounting plate on which a bottom surface of the bin is received; and a support bracket to receive the mounting plate,
wherein the mounting plate includes:
   a seating surface forming a plane on which the bin is seated;
   a guide rib extending upward from an edge of a front end of the seating surface to contact a front surface of the bin; and
   a handle extending in a forward direction from a front surface of the guide rib,
wherein the handle includes a grip groove recessed to be gripped by a person,
wherein the storage chamber is formed as a portion of a surface of the second housing that recessed rearward,
wherein the bin is detachably mounted in the storage chamber,
wherein the storage chamber includes a bottom surface on which the bin is placed, opposing lateral sides, and a rear surface connected to the lateral sides and the bottom surface, and
wherein the pair of sensor brackets are provided on the opposite lateral sides, and one or more first sensors are mounted on the pair of sensor brackets to sense an amount of garbage in the bin.

15. The robot of claim 14,
wherein the support bracket includes a bending part that protrudes downward to be received in a seating groove formed in a lower surface of the storage chamber.

16. The robot of claim 14,
wherein one of the first sensors includes:
   a transmitter to transmit a signal; and
   a receiver to receive a signal,
wherein the transmitter is mounted on one of the sensor brackets, and
wherein the receiver is mounted on another one of the sensor brackets and positioned to face the transmitter.

17. The robot of claim 14, wherein the pair of sensor brackets include rail assemblies to receive rail guides that are provided at opposite sides of the support bracket and that guide a movement of the support bracket in forward and rearward directions.

\* \* \* \* \*